(12) United States Patent
Konanur et al.

(10) Patent No.: US 9,934,895 B2
(45) Date of Patent: Apr. 3, 2018

(54) SPIRAL NEAR FIELD COMMUNICATION (NFC) COIL FOR CONSISTENT COUPLING WITH DIFFERENT TAGS AND DEVICES

(75) Inventors: Anand S. Konanur, San Jose, CA (US); Ulun Karacaoglu, San Diego, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/538,292

(22) Filed: Jun. 29, 2012

(65) Prior Publication Data

US 2014/0002225 A1     Jan. 2, 2014

(51) Int. Cl.
| | | |
|---|---|---|
| H01F 5/00 | (2006.01) | |
| H01P 11/00 | (2006.01) | |
| H04B 5/00 | (2006.01) | |
| H01Q 1/22 | (2006.01) | |
| H01Q 7/00 | (2006.01) | |

(52) U.S. Cl.
CPC ........... *H01F 5/003* (2013.01); *H01Q 1/2216* (2013.01); *H01Q 1/2266* (2013.01); *H01Q 7/00* (2013.01); *H04B 5/0081* (2013.01); *Y10T 29/49016* (2015.01)

(58) Field of Classification Search
CPC .... H01F 5/00; G06K 7/0008; G06K 7/10386; G06K 7/13095; G06K 7/10237; H04Q 2213/13095; H05K 3/4602; H05K 2201/09063; H05K 3/4623; H05K 2201/09672; H05K 1/185
See application file for complete search history.

(56) References Cited

U.S. PATENT DOCUMENTS

| | | | | |
|---|---|---|---|---|
| 2003/0030533 | A1* | 2/2003 | Waffenschmidt | 336/200 |
| 2007/0040761 | A1* | 2/2007 | Waterhouse | H01Q 1/38 343/895 |
| 2008/0245851 | A1* | 10/2008 | Kowalski | 235/375 |
| 2010/0123561 | A1* | 5/2010 | Nam et al. | 340/10.5 |
| 2010/0302039 | A1* | 12/2010 | Goto | H01Q 7/00 340/572.7 |
| 2011/0266883 | A1* | 11/2011 | Eray | 307/104 |

FOREIGN PATENT DOCUMENTS

| | | |
|---|---|---|
| JP | 09-055622 A | 2/1997 |
| JP | 2006-287659 A | 10/2006 |
| JP | 2009-112062 A | 5/2009 |
| KR | 10-0809051 B1 | 3/2008 |
| KR | 10-2009-0061584 A | 6/2009 |

(Continued)

OTHER PUBLICATIONS

Rohde & Schwarz, Near Field Communication (NFC) Technology and Measurements, 2011.*

(Continued)

*Primary Examiner* — Ping Hsieh
*Assistant Examiner* — James Yang
(74) *Attorney, Agent, or Firm* — Schiff Hardin LLP

(57) ABSTRACT

This document discloses one or more systems, apparatuses, methods, etc. for integrating a spiral near field communications (NFC) coil antenna to a portable device for consistent coupling with different tags and devices.

20 Claims, 5 Drawing Sheets

(56) References Cited

FOREIGN PATENT DOCUMENTS

WO    2014/004779 A1    1/2014

OTHER PUBLICATIONS

Bilginer et al, NFC thesis, 2011 http://cwi.unik.no/images/Master_thesis_lu_NFC.pdf.*
International Search Report and Written Opinion received for PCT Application No. PCT/US2013/048101, mailed on Sep. 27, 2013, 11 pages.
International Preliminary Report on Patentability and Written Opinion received for PCT Patent Application No. PCT/US2013/048101, mailed on Jan. 8, 2015, 8 pages.

* cited by examiner

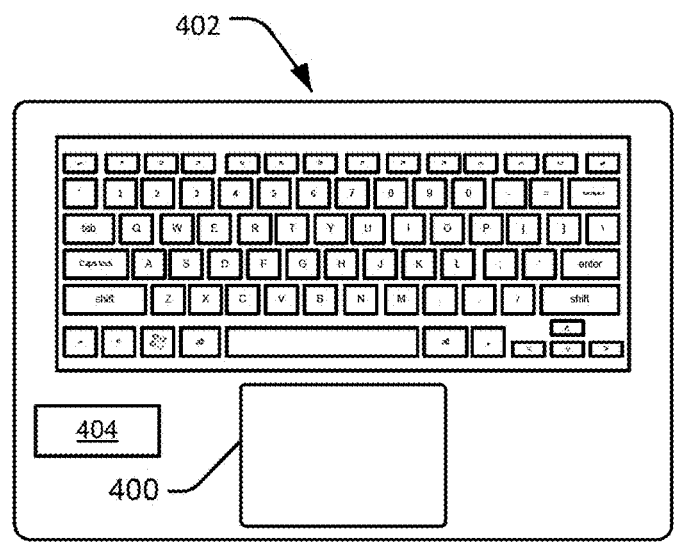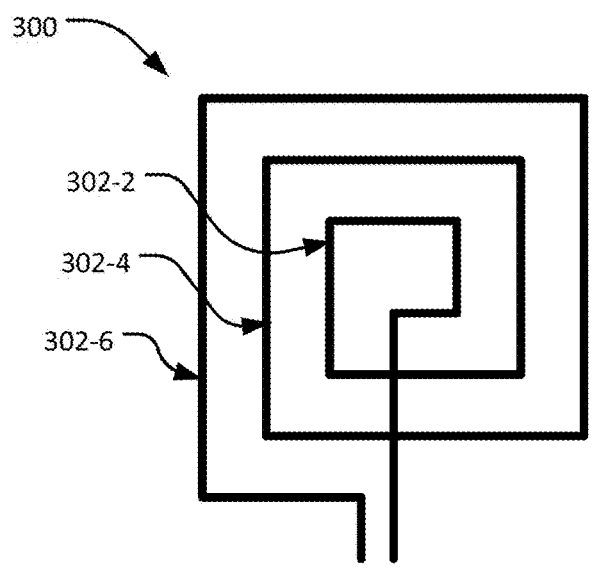
FIG. 4

SPIRAL NEAR FIELD COMMUNICATION (NFC) COIL FOR CONSISTENT COUPLING WITH DIFFERENT TAGS AND DEVICES

BACKGROUND

Recently, technologies have arisen that allow near field coupling (e.g., wireless power transfers (WPT) and near field communications (NFC)) between portable devices in close proximity to each other. Such near field coupling functions may use radio frequency (RF) antennas in the devices to transmit and receive electromagnetic signals. Because of user desires (and/or for esthetic reasons) many of these portable devices are small (and becoming smaller), and tend to have exaggerated aspect ratios when viewed from the side. As a result, many of these portable devices incorporate flat antennas, which use coils of conductive material as their radiating antennas for use in near field coupling functions.

The NFC Forum is a group of members who develop NFC specifications, ensures interoperability among devices and services, promotes the use of NFC technology and educates the market about it as well. The NFC Forum was formed in 2004 and has over 150 different members ranging from manufacturers, application developers, financial services institutions and more. Some of the main goals of the NFC Forum are to: develop standards-based NFC specifications that define architecture and interoperability parameters for NFC devices and protocols; encourage the development of products using NFC Forum specifications; and work to ensure that products claiming NFC capabilities comply with NFC Forum specifications.

NFC coils in readers, card emulation devices and peer to peer devices (e.g. tags, NFC phones/tablets/Ultrabooks/notebooks) come in various sizes and form factors requiring coils of many different sizes. To address analog coil coupling issues due to a large variation in the installed base and anticipated future NFC devices, the NFC forum has defined three reference sizes (i.e., listeners 6, 3 and 1) for the readers and tag references. Hence, to successfully pass NFC forum certification, a particular device needs to couple consistently with each of the three reference size coils. Since coil coupling depends to a large extent on the relative sizes of the coils at the Transmit (Tx) and Receive (Rx) ends of a coupled system, this requirement to couple well with all three sizes (i.e., types of listeners) and all three types of listeners or pollers pose a challenge to designers. In a reader device for example, optimizing performance with one reference listener coil (e.g., proximity integrated circuit card (PICC) 1, the largest reference coil), causes performance to deteriorate with the other listeners with smaller coils (i.e., PICC 3 and PICC 6). Current solutions for reader coils are all optimized for one size of reference listener and rely on having enough margin to clear thresholds of performance required with the other listeners. Even if this is achieved, the nature of field strength curves in the vicinity of a coil are different, and the user does not experience a consistent user experience when different sized tags are used with a given reader using a conventional antenna.

BRIEF DESCRIPTION OF THE DRAWINGS

FIG. 4 illustrates an example integration of a spiral shaped near field communications (NFC) coil antenna configuration in a keyboard area of a portable device.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for integrating a spiral near field communications (NFC) coil antenna to a portable device for consistent coupling with different tags and devices. In an implementation, the NFC coil antenna may include a continuous multiple loops of coil antenna to form a spiral ring shaped antenna (e.g., rectangular shape). In this implementation, the spiral shaped NFC coil antenna may be configured to include a special pattern or design to work with multiple sized tags or readers during NFC related functions. For example, the special pattern or design may include at least three rectangular loops (i.e., spiral turns) with different rectangular loop areas to obtain maximum and efficient coupling between the spiral NFC coil antenna and the multiple sized tags or readers. In an implementation, the multiple sized tags or readers may adopt standard antenna coil designs that are defined by NFC forum for reference listening devices (e.g., NFC Forum defined listeners 6, 3 and 1). For example, a first tag that adopts the NFC Forum listener 6 may have a coil antenna design that covers a smaller area as compared to a second tag that adopts the NFC Forum listener 3. In another example, the second tag that adopts the NFC Forum listener 3 may have the coil antenna design that covers smaller area as compared to a third tag that adopts the NFC Forum listener 1. In other words, the at least three rectangular loops of the spiral shaped NFC coil antenna in the above implementation is configured to include gradual distribution of individual turns such that the individual turn (i.e., rectangular loop) may perform consistent coupling with corresponding sizes for the tags and readers.

Figure 1:
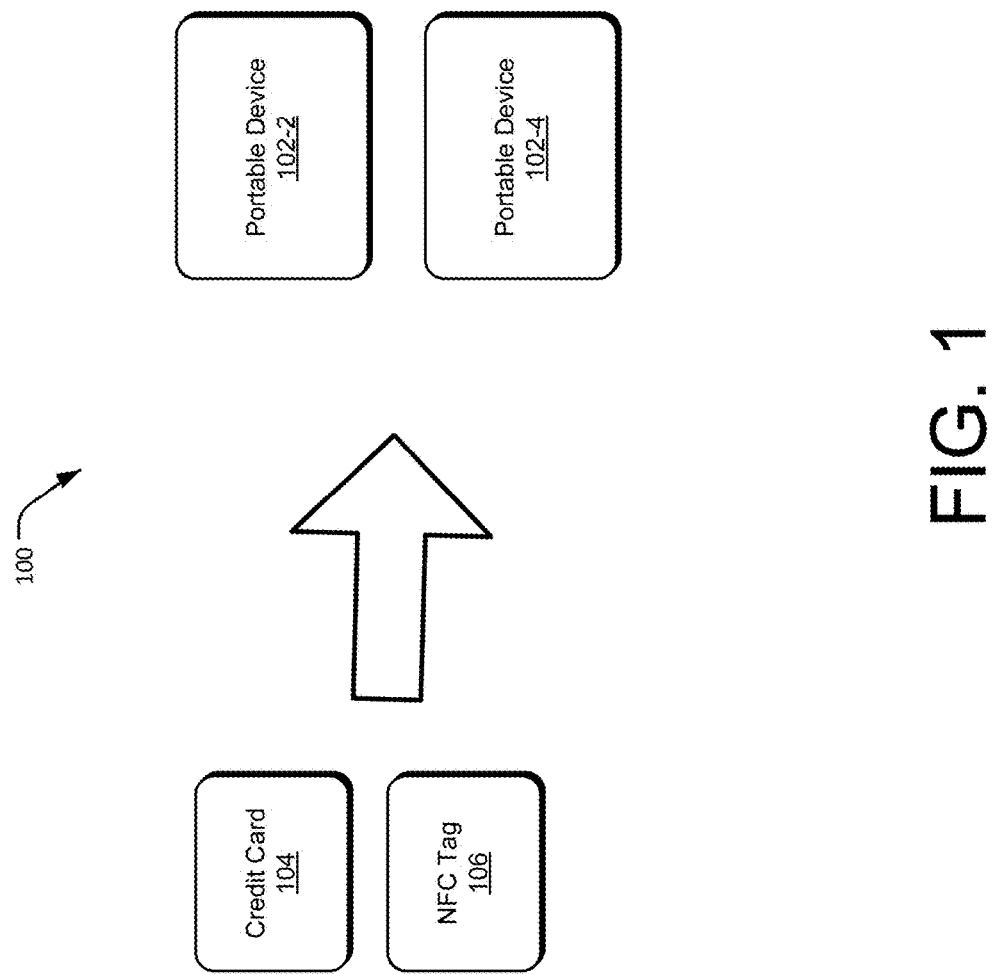
FIG. 1 illustrates portable devices in an example near field coupling arrangement.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include, but are not limited to, ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

In an implementation, FIG. 1 shows two users (not shown) operate their NFC-enabled portable devices 102-2 and 102-4 to perform NFC-related information sharing functions. For example, a front-to-back (not shown), or a back-to-back (not shown) manner may be performed for the NFC communication. In an implementation, the portable devices 102 may accept information from a credit card 104, a NFC tag 106 (or other similar device) through a spiral shaped NFC coil antenna (not shown). The portable devices 102 may require the spiral shaped NFC coil antenna (not shown) to be integrated in a palm rest (not shown) or in other areas of the portable devices 102. For example, the spiral shaped NFC coil antenna (not shown) may be integrated underneath a metal chassis of an Ultrabook portable device 102, or the spiral shaped NFC coil antenna (not shown) may be integrated underneath conductive coating of the portable device 102. In this example, the portable devices 102 may accept information from a credit card 104 or NFC tag 106 through the spiral shaped NFC coil antenna (not shown). In an implementation, the credit card 104 or the NFC tag 106 may include passive devices with coil antenna designs (not shown) that are defined by NFC Forum standards. For example, the coil antenna designs (not shown) for credit card 104 or the NFC tag 106 may adopt the standard coil antenna configurations for the NFC Forum Listeners 1, 3, and 6. In this example, the credit card 104 or the NFC tag 106 may contain different coil antenna configurations (not shown) that include different loop areas depending upon which NFC Forum Listeners 6, 3, or 1 is adopted by the credit card 104 or the NFC tag 106.

Figure 2:
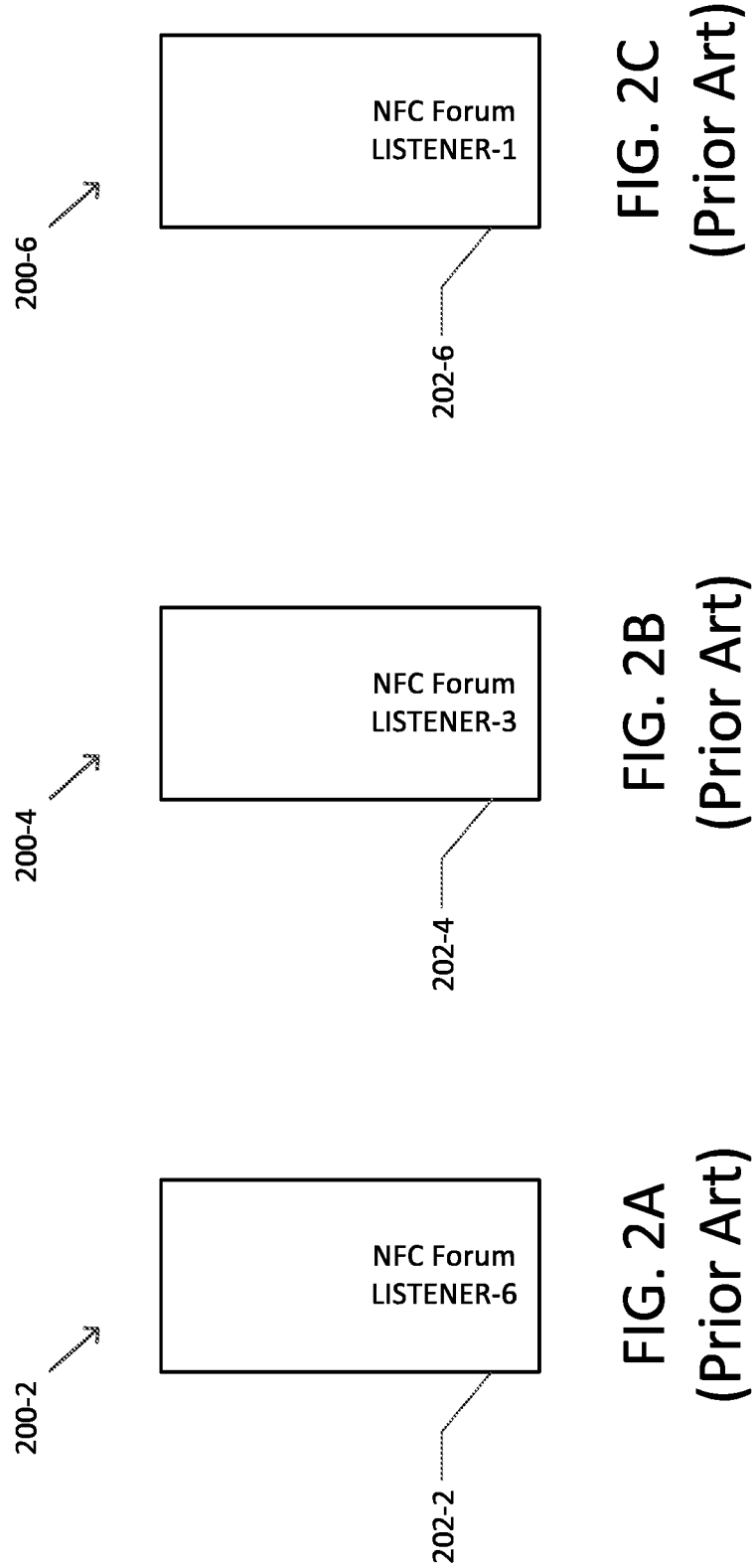
FIG. 2 illustrates example near field communications (NFC) Forum reference listening devices.

FIGS. 2(A), 2(B), and 2(C) illustrate example listener devices. For example, the listener devices 200 may be NFC Forum reference devices. In an implementation, NFC Forum reference listening devices 200 may allow signals obtained by a polling device such as a spiral shaped NFC coil antenna (not shown) to be analyzed. In this implementation, the NFC Forum reference listening devices 200 each have their own antenna coil designs. For example, NFC Forum listener 6 200-2, NFC Forum listener 3 200-4, and NFC Forum listener 1 200-1 are based on outside envelope measurements of International Organization for Standardization (ISO) referenced PICC-6, PICC-3 and PICC-1 antenna designations, respectively. The NFC Forum reference listening devices 200 may be equipped with an integrated sense coil 202 and may send back information through load modulation.

In an implementation, a sense coil 202-2 for the NFC Forum reference listening device 200-2 may include an antenna coil design that covers a smaller area as compared to a sense coil 202-4 for the NFC Forum reference listening device 200-4. Similarly, the sense coil 202-4 for the NFC Forum reference listening device 200-4 may include an antenna coil design that covers a lesser area as compared to a sense coil 202-6 for the NFC Forum reference listening device 200-6. In this implementation, the covered area may be based upon radii of the NFC Forum reference listening devices 200 that are measured from the middle (not shown) of the sense coils 202.

Figure 3:
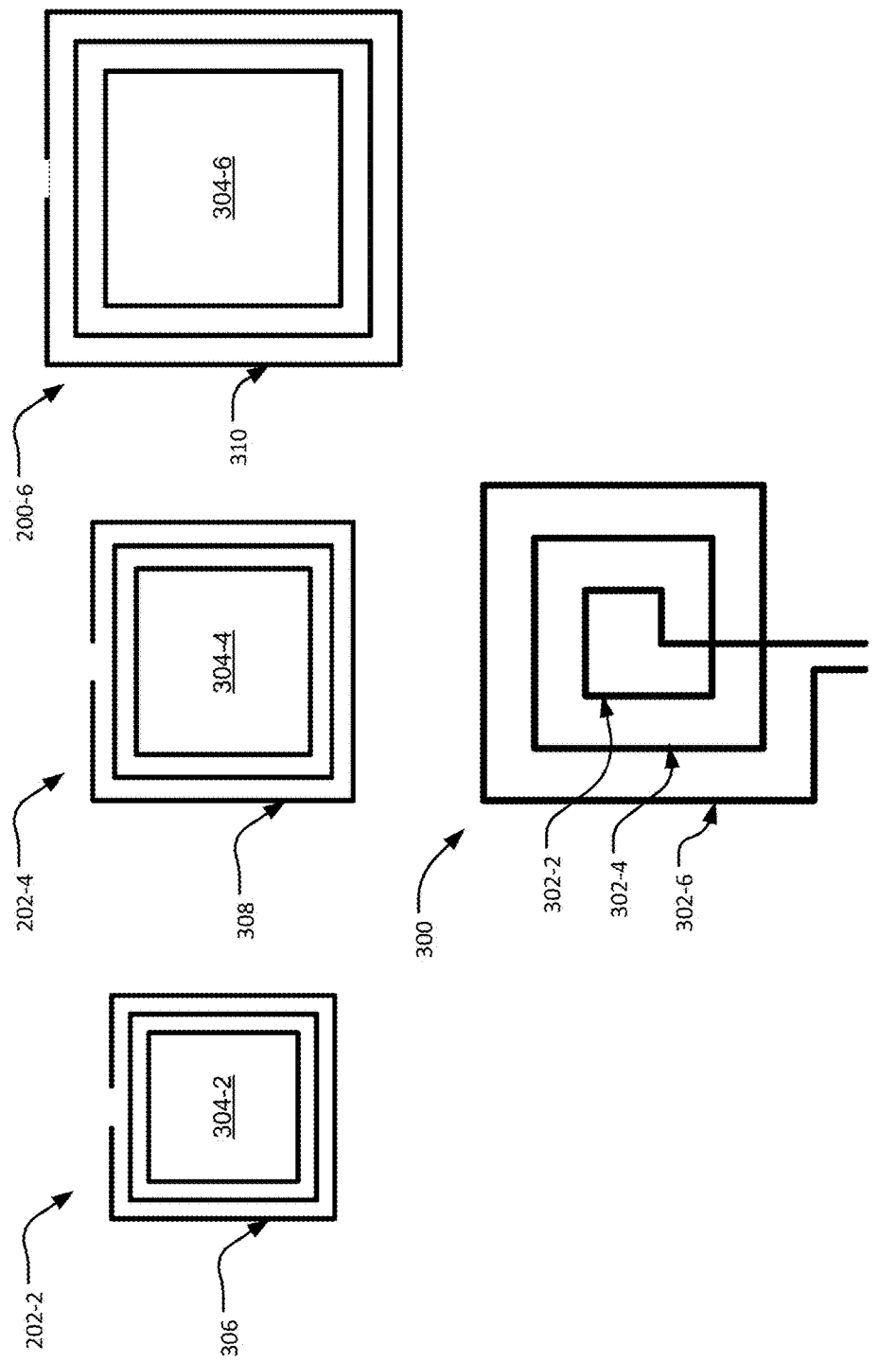
FIG. 3 illustrates example sense coils for near field communications (NFC) Forum reference listening devices, and a spiral shaped NFC coil antenna configuration.

FIG. 3 illustrates an example configuration for the spiral shaped NFC coil antenna and sense coils 200. In an implementation, a spiral shaped NFC coil antenna 300 is constructed to include multiple rectangular loops or turns 302. For example, an innermost layer 302-2, a middle layer 302-4, and an outermost layer 302-6 may be tied continuously to form a single spiral shaped NFC coil antenna 300. In other words, the middle layer 302-4 is tied to or a continuity of the innermost layer 302-2 while the outermost layer 302-6 is tied to or a continuity of the middle layer 302-4. In an implementation, the innermost layer 302-2, middle layer 302-4, and the outermost layer 302-6 may be constructed to cover area 304 for the sense coils 202-2, 202-4, and 202-6, respectively. The areas 304-2, 304-4, and 304-6 may define the different antenna coil designs for NFC Forum listeners 6, 3, and 1, respectively. In other implementations, the spiral shaped NFC coil antenna 300 may include other shapes such as a circle or uneven shape as long as the areas 304 of the sense coils 202 are approximately covered by individual loop or turns 302 of the spiral shaped NFC coil antenna 300.

In an implementation, the sense coil 202-2 with the cover area 304-2 includes at least one or more number of turns 306 that were bunch together without regard to spaces between each loop in the turns 306. For example, the turns 306 may include multiple loops that were confined to almost the same radii (not shown) measured at the center of the sense coil 202-2. In this example, the multiple loops may be spaced thinly to cover the area 304-2.

In an implementation, the sense coil 202-4 with the cover area 304-4 includes at least one or more number of turns 308 that were bunch together without regard to spaces between each loop in the turns 308. For example, the turns 308 may include multiple loops that were confined to almost the same radii (not shown) measured at the center of the sense coil 202-4. In this example, the multiple loops of the turns 308 may be spaced thinly to cover the area 304-4.

In an implementation, the sense coil 202-6 with the cover area 304-6 includes at one or more number of turns 310 that were bunch together without regard to spaces between each loop in the turns 310. For example, the turns 310 may include multiple loops that were confined to almost the same radii (not shown) measured at the center of the sense coil 202-6. In this example, the multiple loops of the turns 310 may be spaced thinly to cover the area 304-6.

With continuing reference to FIG. 3, the innermost layer 302-2 may be configured to adopt the area 304-2 of the sense coil 202-2. For example, when the sense coil 202-2 with the area 304-2 comes within vicinity of the spiral shaped NFC coil antenna 300, a current (not shown) flowing through the innermost layer 302-2 may create a magnetic flux that may lead to another current (not shown) flowing through the sense coil 202-2. A resulting mutual inductance ($S_{21}$) (not shown) between the sense coil 202-2 and the spiral shaped NFC coin antenna 300 (particularly the innermost loop 302-2) may depend upon relative position to each other, magnetic properties of the medium, and the areas (i.e., dimensions) of the two interacting coils. In an implementation, the area (not shown) covered by the innermost layer 302-2 may be configured to overlap at least 80% of the area 304-2 to maintain an otherwise efficient mutual inductance ($S_{21}$) (not shown). For example, if the credit card 104 or the NFC tag 106 implements the sense coil 202-2 in their coil antennas, then the spiral shaped NFC coil antenna 300 (particularly the innermost layer 302-2) may be able to create the mutual inductance ($S_{21}$) (not shown) as described above.

In an implementation, the middle layer 302-4 may be configured to adopt the area 304-4 of the sense coil 202-4. For example, a gradual increase based from the constructed innermost layer 302-2 is configured for the turn 302-4 of the spiral shaped NFC coil antenna 300 in order to maintain the mutual inductance ($S_{21}$) (not shown) that may be derived between the innermost layer 302-2 and the sense coil 202-2 interaction as described above. In this example, the turn 302-4 may cover an area (not shown) that overlaps at least 80% of the area 304-4 of the sense coil 202-4 in order to maintain the mutual inductance ($S_{21}$) (not shown) described above. In other implementations, the middle layer 302-4 and the innermost layer 302-2 may be constructed to adopt a ratio between the areas 304-4 and 304-2 of the sense coils 202-4 and 202-2, respectively.

In an implementation, the outermost layer 302-6 may be configured to adopt the area 304-6 of the sense coil 202-6. For example, another gradual increase is configured for the turn 302-6 of the spiral shaped NFC coil antenna 300 based on the size of the constructed middle layer 302-4. In this example, the gradual increase may be configured to maintain the mutual inductance ($S_{21}$) (not shown) that may be derived between the middle layer 302-4 and the sense coil 202-4 interaction as described above. In other words, the innermost layer 302-2, the middle layer 302-4, and the outermost layer 302-4 are constructed to maintain the mutual inductance ($S_{21}$) (not shown) by having a separate reference between each of them. In an implementation, the turn 302-6 may cover an area (not shown) that overlaps at least 80% of the area 304-6 of the sense coil 202-6. In other implementations, the outermost layer 302-6, the middle layer 302-4 and/or the innermost layer 302-2 may be constructed to adopt the ratio between the areas 304 of the sense coils 202.

FIG. 4 illustrates an example integration of the spiral shaped NFC coil antenna 300 to the portable device 102. In an implementation, spiral shaped NFC coil antenna 300 may be mounted on, embedded in, or otherwise associated with a metallic chassis (e.g., metal free spaces at below trackpad 402 in a keyboard area 402) of the portable device 102. The spiral shaped NFC coil antenna 300 may include a dedicated antenna for NFC purposes. In other words, the spiral shaped NFC coil antenna 300 may be configured to operate on a separate resonant frequency (e.g., 13.56 MHz to implement NFC operations), and independent from another antenna that uses standard frequencies used in wireless communications (e.g., 5 GHz for WiFi signals). The spiral shaped NFC coil antenna 300 may be made out of a printed circuit board (PCB), a flexible printed circuit (FPC), a metal wire, created through a laser direct structuring (LDS) process, or directly embedded to the metal free space below the trackpad 402 of the portable device 102.

In an implementation, an NFC module 404 may be integrated anywhere inside the keypad area 400 or in other areas such us, beside the trackpad area 400. The NFC module 404 may include transceiver circuitry that processes electrical signal in the spiral shaped NFC coil antenna 300. For example, the NFC module 402 may be used to provide tuning to the spiral shaped NFC coil antenna 300 for maximum power transfer during transmit or receive operations. In other implementations, the NFC module 404 may be integrated with the spiral shaped NFC coil antenna 300 to form a single module.

Figure 5:
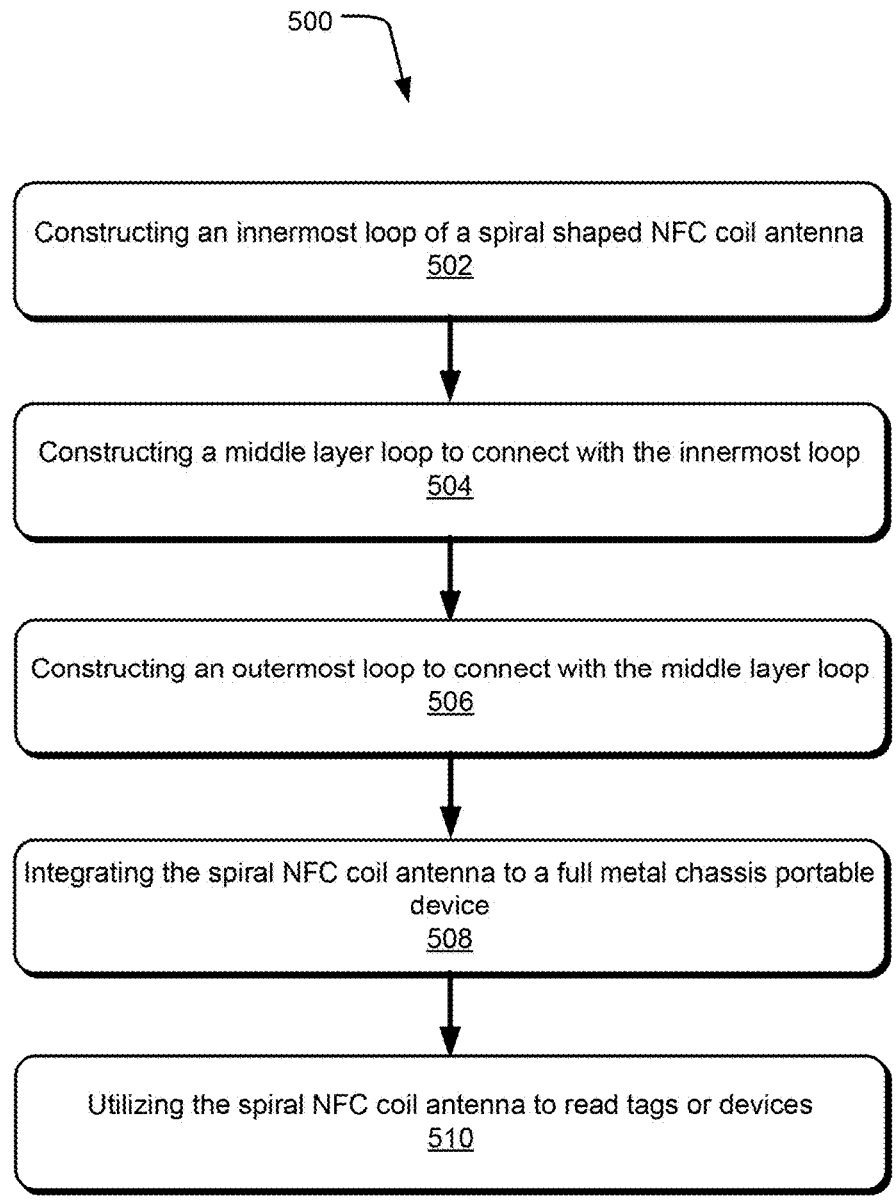
FIG. 5 is an example method to construct a spiral shaped near field communications (NFC) coil antenna for integration in a portable device.

FIG. 5 shows an example process chart 500 illustrating an example method for constructing a spiral shaped NFC coil antenna to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, constructing an innermost loop of the spiral shaped NFC coil antenna is performed. In an implementation, the innermost loop (e.g., innermost loop 302-2) of the spiral shaped NFC coil antenna (e.g., spiral shaped NFC coil antenna 300) is constructed and/or configured to cover an area (e.g., area 304-2) of a sense coil (e.g., sense coil 202-2) for NFC Forum listener 6 (e.g., NFC Forum listener 6 200-2). In this implementation, the innermost layer 302-2 may be configured to overlap at least 80% of the area 304-2 of the sense coil 202-2 to maintain an otherwise efficient mutual inductance ($S_{21}$).

At block 504, constructing a middle layer loop that is tied to the innermost loop of the spiral shaped NFC coil antenna is performed. In an implementation, the middle layer loop (e.g., middle layer loop 302-4) is a continuity of the innermost loop 302-2 of the spiral shaped NFC coil antenna 300. For example, a gradual increase based from the constructed innermost layer 302-2 is configured for the middle layer loop 302-4 of the spiral shaped NFC coil antenna 300 in order to maintain the mutual inductance ($S_{21}$) that may be derived between the innermost layer 302-2 and the sense coil 202-2 interaction as described above. In this example, the middle layer loop 302-4 may cover an area that overlaps at least 80% of the area 304-4 of the sense coil 202-4. In other implementations, the middle layer 302-4 and the innermost layer 302-2 may be constructed to adopt a ratio between the areas 304-4 and 304-2 of the sense coils 202-4 and 202-2, respectively.

At block 506, constructing an outermost loop that is tied to the middle layer loop of the spiral shaped NFC coil antenna is performed. In an implementation, the outermost loop (e.g., outermost loop 302-6) is a continuity of the middle layer loop 302-4 and the innermost loop 302-2 of the spiral shaped NFC coil antenna 300. The construction of the outermost loop 302-6 may be based from standard coil antenna design (e.g., sense coil 200-6) for a NFC Forum listener 1 (e.g., NFC Forum listener 1 200-6). In an implementation, the standard coil antenna design for the NFC Forum listeners 200-6, 200-3, and 200-1, are progressively larger in size.

At block 508, integrating the spiral shape NFC coil antenna to a portable device. For example, the spiral shape NFC coil antenna 300 is integrated to the portable device 102.

At block 510, utilizing the spiral shape NFC coil antenna for NFC related operations.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A portable device comprising:
   one or more processors;
   a memory configured to the processors;
   a spiral shaped near field communications (NFC) coil antenna configured to the processors wherein the spiral shaped NFC coil antenna includes a first loop, a second loop tied to the first loop, and a third loop tied to the second loop, wherein the first loop, the second loop, and the third loop are progressively larger in size based upon a substantial amount of mutual inductances obtained with reference to a first, a second, and a third reference listening devices, respectively, wherein the first loop, the second loop and the third loop are disposed on a single plane, and wherein the first, the second, and the third reference listening devices have progressively larger sized antenna loop areas.

2. The portable device as recited in claim 1, wherein the first, the second, and the third reference listening devices are NFC Forum—reference listening devices that include coil antenna designs used in credit cards, tags, or devices.

3. The portable device as recited in claim 1, wherein the first, the second, and the third reference listening devices include a sense coil with at least one or more number of turns that are grouped together without regard to spaces between each loop in the turns.

4. The portable device as recited in claim 1, wherein the first loop, the second loop, and the third loop are configured to include rectangular shapes that correspond to the progressively larger sized antennas loop areas.

5. The portable device as recited in claim 1, wherein the first loop, the second loop, and the third loop are configured to overlap at least 80% of the corresponding antenna loop areas of the first, second, and third NFC reference listening devices.

6. The portable device as recited in claim 1, wherein the first loop, the second loop, and the third loop are configured to maintain the substantial amount of mutual inductance with different sized antennas of the reference listening devices by configuring construction of each loop to have a separate reference from the other loop.

7. The portable device as recited in claim 1, wherein the spiral shaped NFC coil antenna is made out of a printed circuit board (PCB), a flexible printed circuit (FPC), a metal wire created through a laser direct structuring (LDS) process, or directly embedded to metal chassis and underneath conductive coating of a portable device.

8. The portable device as recited in claim 1, wherein different sized antennas of the reference listening devices have different relative centers.

9. A near field communications (NFC) antenna comprising:
   a continuous loop of coil antenna to form a planar spiral shaped NFC coil antenna to include an innermost loop, a middle loop, and an outermost loop, wherein the innermost loop, the middle loop, and the outermost loop are progressively larger in size based upon a substantial amount of mutual inductances obtained with reference to a first, a second, and a third reference listening devices, respectively, wherein the innermost loop, the middle loop and the outermost loop are multi-turn loops having two or more turns, wherein the first, the second, and the third reference listening devices have progressively larger sized sense coils areas; and
   an NFC module to tune the coil antenna.

10. The NFC antenna in claim 9, wherein the innermost loop, the middle loop, and the outermost loop are configured as a rectangular shape, a circular shape, or a dissimilar shape.

11. The NFC antenna in claim 9, wherein the innermost loop, the middle loop, and the outermost loop are configured to overlap at least 80% of the corresponding antenna loop areas of the first, second, and third reference listening devices, which are NFC—Forum reference listening devices.

12. The NFC antenna in claim 9, wherein the innermost loop is tied to the middle loop, and the middle loop are tied to the outermost loop.

13. The NFC antenna in claim 9, wherein the planar spiral shaped NFC coil antenna is made out of a printed circuit board (PCB), a flexible printed circuit (FPC), a metal wire, created through a laser direct structuring (LDS) process, or directly embedded to metal chassis and underneath conductive coating of a portable device.

14. The NFC antenna in claim 9, wherein different sized antennas of the reference listening devices have different relative centers.

15. A method of constructing a spiral shaped near field communications (NFC) coil antenna for a portable device comprising:
   constructing an innermost loop of the spiral shaped NFC coil antenna;
   constructing a middle loop that is tied to the innermost loop;
   constructing an outermost loop that is tied to the middle loop, wherein the innermost loop, the middle loop, and the outermost loop are progressively larger in size based upon a substantial amount of mutual inductances obtained with reference to a first, a second, and a third reference listening devices, respectively, wherein the innermost loop, the middle loop and the outermost loop are disposed on a single plane, and wherein the first, the second, and the third reference listening devices have progressively larger sized sense coils areas; and
   integrating the spiral shape NFC coil antenna to the portable device.

16. The method in claim 15, wherein the innermost loop, the middle loop, and the outermost loop are used to read credit cards, tags or devices, wherein the innermost loop, the middle loop, and the outermost loop are based upon loop areas of different sense coil designs as defined by listeners 6, 3, and 1, respectively.

17. The method in claim 15, wherein constructing the innermost loop, the middle loop, and the outermost loop are based on a ratio of loop areas that are covered by the different sized listener sense coils as defined by listeners 6, 3, and 1.

18. The method in claim 15, wherein the spiral shaped NFC coil antenna is rectangular in shape.

19. The method in claim 15, wherein constructing the innermost loop, middle loop and the outermost loop include maintaining of the substantial amount of mutual inductance with different sized antennas of the reference listening devices by configuring the construction of each loop to be based from a separate reference from the other loop.

20. The method of claim 15, wherein the different sized antennas of the reference listening devices have different relative centers.

* * * * *